US006729543B1

(12) United States Patent
Arons et al.

(10) Patent No.: US 6,729,543 B1
(45) Date of Patent: May 4, 2004

(54) PAGE IDENTIFICATION SYSTEM AND METHOD

(75) Inventors: Barry M. Arons, Waltham, MA (US); Lisa J. Stifelman, Waltham, MA (US); Stephen D. Fantone, Lynnfield, MA (US); Kevin Sevigny, Newburyport, MA (US)

(73) Assignee: AudioVelocity, Inc., Mountain View, CA (US)

( * ) Notice: Subject to any disclaimer, the term of this patent is extended or adjusted under 35 U.S.C. 154(b) by 0 days.

(21) Appl. No.: 09/263,978

(22) Filed: Mar. 5, 1999

Related U.S. Application Data

(60) Provisional application No. 60/077,098, filed on Mar. 6, 1998, provisional application No. 60/077,078, filed on Mar. 6, 1998, provisional application No. 60/077,067, filed on Mar. 6, 1998, provisional application No. 60/077,066, filed on Mar. 6, 1998, and provisional application No. 60/077,061, filed on Mar. 6, 1998.

(51) Int. Cl.[7] .................................................. G06K 7/10
(52) U.S. Cl. ........................... 235/462.13; 235/462.01; 235/462.25
(58) Field of Search .................. 235/462.01, 462.13, 235/462.06, 462.25, 462.26, 462.27, 462.28, 462.29

(56) References Cited

U.S. PATENT DOCUMENTS

| | | | |
|---|---|---|---|
| 4,633,395 A | 12/1986 | Kuehfuss ...................... 364/403 |
| 4,636,881 A | 1/1987 | Brefka et al. ............... 360/74.1 |
| 4,809,246 A | 2/1989 | Jeng ............................ 434/317 |
| 4,862,497 A | 8/1989 | Seto et al. ................... 379/355 |
| 4,879,557 A | 11/1989 | Roche .......................... 341/23 |
| 4,884,974 A | 12/1989 | DeSmet ....................... 434/317 |
| 4,949,999 A | 8/1990 | Ke-hui ......................... 283/38 |
| 5,243,149 A | 9/1993 | Comerford et al. ........... 178/18 |
| 5,407,357 A | 4/1995 | Cutler ......................... 434/335 |
| 5,417,575 A | 5/1995 | McTaggart ................... 434/317 |
| 5,444,230 A | 8/1995 | Baldwin et al. | |
| 5,471,043 A | 11/1995 | Knapp et al. ................. 235/472 |
| 5,485,176 A | 1/1996 | Ohara et al. ................. 345/173 |

(List continued on next page.)

FOREIGN PATENT DOCUMENTS

| | | | | |
|---|---|---|---|---|
| DE | 196 15 986 A1 | 10/1996 | ............. G06F/3/00 |
| DE | 297 14 828 U1 | 12/1997 | ............. G06K/7/10 |
| EP | 0 752 675 A1 | 1/1997 | ............. G06F/17/30 |
| WO | 97/18508 | 5/1997 | ............. G06F/3/033 |
| WO | 99/10834 | 3/1999 | ............. G06K/9/00 |

OTHER PUBLICATIONS

L.J. Stifelman. Augmenting Real–World Objects: A Paper–Based Audio Notebook. In the Proceedings of CHI '96. ACM–SIGCHI, 1996.

L.J. Stifelman. The Audio Notebook: Paper and Pen Interaction with Structured Speech. Doctoral Dissertation. Massachusetts Institute of Technology, Sep. 1997.

(List continued on next page.)

*Primary Examiner*—Karl D. Frech
(74) *Attorney, Agent, or Firm*—Bever, Hoffman & Harms, LLP; Jeanette S. Harms

(57) ABSTRACT

An information processing system automatically identifies the page of a book, notebook, flip chart, writing pad, or the like. The system uses an optical sensor to read an identification code printed on each page (and the cover) of the book and processes the code to determine identifying information (e.g., page number) for the page. The optical sensor and related components are adjacent to the book and operate unobtrusively, yet reliability, at a distance therefrom. The system, which uses ambient light and selectively activates its own light source, is capable of operating under variable lighting conditions and requires no manual intervention by the user. In addition, the system is reliable and robust in that it allows standard printing techniques to be used to print the identification code on each page of the book.

17 Claims, 18 Drawing Sheets

U.S. PATENT DOCUMENTS

| | | | |
|---|---|---|---|
| 5,548,106 A | 8/1996 | Liang et al. ................. 235/454 |
| 5,563,955 A | 10/1996 | Basset et al. |
| 5,572,651 A | 11/1996 | Weber et al. ............... 395/155 |
| 5,575,659 A | 11/1996 | King et al. ................. 434/467 |
| 5,581,071 A | 12/1996 | Chen et al. ................. 235/455 |
| 5,608,639 A | 3/1997 | Twardowski et al. .. 364/469.04 |
| 5,627,349 A | 5/1997 | Shetye et al. ................. 178/18 |
| 5,629,499 A | 5/1997 | Flickinger et al. ............ 178/18 |
| 5,630,168 A | 5/1997 | Rosebrugh et al. ......... 395/825 |
| 5,631,883 A | 5/1997 | Li ............................... 369/31 |
| 5,640,001 A | 6/1997 | Danielson et al. |
| 5,661,506 A | 8/1997 | Lazzouni et al. ........... 345/179 |
| 5,682,227 A * | 10/1997 | Taguchi et al. ............... 355/25 |
| 5,707,240 A | 1/1998 | Haas et al. ................. 434/317 |
| 5,734,129 A | 3/1998 | Belville et al. ............... 178/18 |
| 5,803,748 A | 9/1998 | Maddrell et al. ........... 434/317 |
| 5,808,286 A | 9/1998 | Nukui et al. ................ 235/472 |
| 5,818,528 A | 10/1998 | Roth et al. ................. 348/364 |
| 5,902,988 A | 5/1999 | Durbin |
| 6,138,915 A | 10/2000 | Danielson et al. |
| 6,149,062 A | 11/2000 | Danielson et al. |
| 6,158,662 A * | 12/2000 | Kahn et al. ............. 235/472.01 |
| 6,164,545 A | 12/2000 | Danielson |
| 6,179,444 B1 * | 1/2001 | Plesko ........................ 362/259 |
| 6,259,043 B1 | 7/2001 | Clary et al. |
| 6,510,994 B1 * | 1/2003 | Zhu et al. ................... 235/454 |

OTHER PUBLICATIONS

J. Rekimoto and K. Nagao. The World through the Computer: Computer Augmented Interaction with Real World Environments. ACM User Interface Software Technology (UIST) Conference Proceedings, 1995.

Uniform Symbology Specification: Interleaved 2–of–5, ANSI/AIM BC2–1995.

Texas Instruments TSL 1401 Data Sheet. 128 x 1 Linear Sensor Array, no date.

The Bar Code Book. Roger C. Palmer, Helmers Publishing Company. Peterborough, NH. Third Edition, 1995.

* cited by examiner

Front side

Back side

Front side

Back side

PAGE IDENTIFICATION SYSTEM AND METHOD

RELATED APPLICATIONS

This application claims priority to U.S. Provisional Applications, Serial Nos. 60/077,061, 60/077,066, 60/077,067, 60/077,078 and 60/077,098, which were filed on Mar. 6, 1998. In addition, this application incorporates by reference copending U.S. applications entitled, Active Physical Scrollbar for Controlling and Displaying Information, Ser. No. 09/263,003, and Multimedia Linking Device and Method, Ser. No. 09/263,672, filed on even date herewith.

FIELD OF THE INVENTION

The invention relates generally to information processing devices and processes. In particular, the invention relates to information processing devices and processes that automatically recognize an identification code printed on one or more pages within a collection of pages (e.g., a book, notebook, writing pad, flip chart, stack of sheets of paper, etc.) (hereinafter a "book"), on a book cover, and surface below the book.

BACKGROUND OF THE INVENTION

Bar code readers are known in the art and generally come in one of two forms: (1) a scanning laser or charge coupled device (CCD) that is pointed at a bar code while depressing a trigger; and (2) a wand that is swept over a bar code. These devices suffer from a number of limitations for solving the problems addressed by the present invention (e.g., the ability to automatically recognize an identification code printed on one or more pages within a collection of pages). First, known bar code readers require manual input from the user such as pointing, or swiping the instrument over the code. Second, known devices require moving parts which increase the cost and complexity of manufacture, while decreasing reliability. Third, these known devices are designed to identify a bar code in a variety of orientations, making them an overly complex solution for identifying a code in a relatively fixed position with respect to the reader. Fourth, such devices use a visible light source which can disturb the user, or others in the vicinity. Fifth, these device use a scanning laser or a much larger and more expensive sensor array (e.g., 2048×1) than needed for some of the applications addressed by the present invention.

Other known page identification systems use black-and-white or colored squares or stripes (hereinafter "blocks") as the printed codes rather than bar codes, as described in L. J. Stifelman, Augmenting Real World Objects: A Paper-Based Audio Notebook, In the Proceedings of CHI '96, ACM-SIGCHI, 1996 ("Stifelman 1996"); L. J. Stifelman, The Audio Notebook: Paper and Pen Interaction with Structured Speech, Doctoral Dissertation, Massachusetts Institute of Technology, September 1997 ("Stifelman 1997"); and U.S. Pat. No. 4,884,974 to DeSmet ("DeSmet").

These systems, however, have also suffered from a number of limitations. First, the systems do not scale well because of the space required for the blocks representing the codes. Each block represents only one bit of information. Thus, in Stifelman 1997, eleven printed code bits required five inches in width along the bottom of a notebook page. Second, the system is composed of discrete sensors and therefore requires one sensor for every bit of information. This requirement limits the amount of information that can be encoded, and makes the system expensive. Third, the sensor mechanism impedes a user's handwriting movements causing a portion of the page to be unusable. Fourth, the sensors must be precisely aligned with the code on a page to perform properly.

Additional limitations of Stifelman 1996 and DeSmet include the following. First, the systems rely on ambient light, so performance is degraded under dark conditions. Performance is also degraded under very bright conditions since the sensors can be saturated. Second, the sensors can be blocked or shadowed by the user's hand or pen, degrading the performance of the detector.

Additional limitations of Stifelman 1997 include the following. First, each discrete sensor must be activated and read one at a time to conserve power. Second, the system cannot be exposed to any ambient light. Ambient light (e.g., bright sunlight) would saturate the sensors and cause false readings. Third, the sensors need to be positioned directly over the page code. The sensors are embedded inside of a ledge that is positioned over the bottom of a notebook. This causes several problems: (1) a book must be slid in and out under the ledge to turn pages; (2) a user cannot rest his/her hand on the notebook or table while writing. Since the ledge was placed over the bottom portion of the notebook, the user must place his/her hand over the ledge. This makes writing in the book, particularly on the lower portion of the page closest to the ledge, difficult and uncomfortable.

Limitations of a system described in J. Rekimoto and K. Nagao, The World through the Computer: Computer Augmented Interaction with Real World Environments, ACM User Interface Software Technology (UIST) Conference Proceedings, 1995 ("Rekimoto") include the following. First, Rekimoto requires manual operation by a user. A user must point a camera at the code, and a video camera is an expensive solution. Second, color codes are more expensive to print than a black-and-white bar code and require the availability of a color printer. Third, as stated above, the codes do not scale well. The number of detectable identification codes is limited by the size of the codes. Also, each code stripe represents only one bit of information (stripes are one of two colors, and of equal size).

Another related area known in the art includes electronic books, which modify book pages for identification purposes by putting tabs on pages, cutting out notches, or other similar means. For example, U.S. Pat. No. 4,862,497 to Seto et al ("Seto"); U.S. Pat. No. 5,485,176 to Ohara et al. ("Ohara"); and U.S. Pat. No. 4,809,246 to Jeng ("Jeng") use photo sensors to sense the presence or absence of a tab on the edge of each page. Similarly, Ohara uses notches instead of tabs, and Jeng additionally requires a button to be pushed whenever a page is turned. The systems described in these patent have several limitations. First, tabs or notches must be cut into pages, and the pages must be rigid or stiff. Second, one sensor is needed for each page. This limits the number of pages that can be coded. With more pages, additional sensors are required, and more space needed for them. Also, each additional sensor adds an additional cost. Third, the tabs must be reflective (white or metal) or opaque.

Other electronic books have used magnets or switches embedded in book pages for page identification. See, for example, U.S. Pat. No. 5,417,575 to McTaggart ("McTaggart"); U.S. Pat. No. 5,631,883 to Li ("Li"); and U.S. Pat. No. 5,707,240 to Haas et al. ("Haas"). McTaggart uses electronics embedded in laminated pages. Electromagnetic switches on pages are used to detect which page is open. Li uses conductive stripes on pages and electromechanical contacts which are prone to failure (e.g., due to dirt on contacts) and require manual operation (i.e., the user touches a button to open/close the contact mechanism). The conductive stripes also have to be exactly aligned with the contacts. Also, turning pages can be difficult since the contacts come down over the page. Haas detects the position of pages using magnets embedded in the page. In each of these systems, the book must be specially produced (i.e., it cannot be printed using standard book printing techniques) and can be expensive to manufacture.

Another area known in the art includes devices for capturing writing on forms. See, for example, U.S. Pat. No. 5,629,499 to Flickinger et al. ("Flickinger"); U.S. Pat. No. 5,734,129 to Belville et al. ("Belville"); U.S. Pat. No. 5,627,349 to Shetye et al. ("Shetye"); and U.S. Pat. No. 5,243,149 to Comerford et al. ("Comerford"). Flickinger and Shetye describe a device which secures a form to the device using a clip at the top or bottom. Flickinger suggests that a bar code reader could be embedded in the clip that could automatically read a code on the form. However, the design of this component is not disclosed, and it appears that such a design would be limited because the clip would have to be positioned directly over a form to identify it. Thus, the user would have to lift the clip manually and insert a sheet. It also appears that this design would not generalize for use with a book or notebook, where a user is accustomed to turning pages freely without clipping them in and out. Comerford describes a device where documents are read into the system using a scanner that is slid over the page. The scanner must be manually operated by the user, requires contact with the paper, and is expensive.

U.S. Pat. No. 4,636,881 to Brefka et al. ("Brefka") uses infrared sensors to detect when a page is turned. This is limited to detecting only relative movement of pages (i.e., previous page, next page) and cannot identify an exact page number. If two or more pages are turned at once, this approach does not work properly.

OBJECTS AND ADVANTAGES OF THE INVENTION

The invention offers several advantages over the art. The objects and advantages of the invention include the following. One object of the invention is to provide an apparatus that does not require manual operation by a user (e.g., button pushing, pointing an instrument at a code, swiping an instrument over a code). Another object is to provide an apparatus with no moving parts and a minimal number of components, making it inexpensive and simple to manufacture. Yet another object is to provide an apparatus that operates reliably under variable lighting conditions, i.e., from bright light to complete darkness. Still another object is to provide an apparatus that automatically adapts to various light levels.

Another object of the invention is to provide an apparatus that allows multiple pages to be turned at once and does not require sequential page turning. Yet another object is to provide an apparatus that includes an optical sensor and related components that can operate unobtrusively at a distance from the book, and that do not need to be directly looking down over a page and do not require physical contact with the book. Still another object is to provide an apparatus that does not impede the user's hand movements when writing or gesturing in the book.

Another object of the invention is to provide an apparatus that does not impede page turning by the user. Yet another object is to provide an apparatus that allows book pages to be turned without removal of the book from the receiving surface of the apparatus. Still another object is to provide an apparatus that does not generate false readings when an external object, such as a pen or a finger, partially obscures the optical sensor. Another object is to provide an apparatus that allows minor misalignments of the book in relation to the optical sensor. Yet another object is for the printed code to take up minimal space on the book pages (e.g., only a small corner of a page as opposed to a whole edge of a page). Still another object is to provide an apparatus that only requires a single sensor chip to read a code containing multiple bits of data Another object of the invention is to provide an apparatus that reads identification codes from a relatively fixed position in relation to the optical sensor. Yet another object is to provide an apparatus that uses an invisible light source so as not to disturb a user or others in the vicinity of the apparatus. Still another object is to provide an apparatus with a rapid response time for recognizing the code on a book page with minimal delay following a page turn.

Another object of the invention is to provide an apparatus with identification codes that have built-in redundancy for greater reliability. Yet another object is to provide an apparatus that can operate with a low resolution optical sensor. Still another object is to provide an apparatus that uses identification codes that can be printed on commonly available computer printers (e.g., laser printer, ink jet printer, etc.) or through standard printing techniques (e.g., offset printing).

Another object of the invention is a book with coded pages to identify the pages, or information about a page. Yet another object is a book coded with a width-modulated bar code to ease reading of the code. Still another object is that the codes can identify individual books uniquely, or identify a specific page within a specific book. Yet another object is a code in an upper quadrant of a book so it is out of the way of reading or writing on the page. Another object of the invention is a code along the edge of the book. Yet another object is a code on the cover of the book to identify the cover or uniquely identify an entire book. Still another object is a code on the background area where the book is placed to identify when a book is not present. Still another object is a book using a non-spiral binding to prevent vertical misalignment of pages. Yet another object is a book using round holes for binding to ease page turning.

Another object of the invention is to provide an apparatus that does not require holes, tabs, or notches to be cut in the paper. Yet another object is to provide an apparatus that does not require thick or rigid pages. Still another object is to provide an apparatus that uses a bar code symbology with minimal or no start and stop codes. Further objects and advantages of the invention will become apparent from a consideration of the drawings and ensuing description.

SUMMARY OF THE INVENTION

The present invention is a system and method for automatically identifying information (e.g., page numbers) in a book by reading an identification code (e.g., a bar code) printed on each page, on the book cover, and on a surface below the book. The codes on the cover and surface below the book can be used to signal that the book is closed or removed from the system. In addition, the code on the cover can be used to uniquely identify the book, and the codes on the pages can uniquely identify the book and each individual page. Hereafter, the term "page" generically refers to planar surfaces such each side of a leaf in a book, the book cover, a surface below the book, a touch sensitive surface, etc.

In some embodiments, the invention uses an optical sensing technique that allows an optical sensor and related components to be located adjacent to and at a distance from the book so as to not impede the user when turning the pages of the book. The system operates automatically to identify the book and its pages (i.e., no manual operation by a user is required).

The system can operate using ambient light. If, however, ambient light conditions are inadequate for the optical sensor to properly read the codes, the system selectively activates a light source that artificially illuminates the code area. The light source can be non-visible, so that it cannot be seen to anyone looking at, or writing on, the page.

More particularly, the system includes a holder for receiving the book and for keeping it in a substantially fixed position relative to the rest of the system. Once the book is in place, the optical assembly that is located adjacent to the book (such that it does not impede page turning or book insertion and removal) detects the identification code on the page and converts this optical image information into electrical signals for further processing. The optical assembly includes, for example, a reflecting element (e.g. a mirror), a focusing element (e.g. a lens), and an optical sensor. The reflecting element directs light reflected from the identification code onto the focusing element which focuses the light onto the optical sensor so that the optical image can be converted into electrical signals for further processing.

The processor operates on the electrical signals in order to decode them into book and page number information. If the ambient light conditions are insufficient to detect the code, the processor can automatically activate a light source to improve the illumination of the code area on the book. The reflecting element of the optical assembly can direct the light received from the light source onto the identification code on the page.

The identification code can be in the form of a width modulated bar code. The bar code can be a standard bar code or it can be a custom bar code containing for example a single-bar stop code or no start and stop codes whatever. The system is capable of accepting these simplified bar codes, thereby enabling a higher signal-to-noise ratio in the resultant image.

BRIEF DESCRIPTION OF THE DRAWINGS

The details and advantages of this invention may be better understood by referring to the following description taken in conjunction with the accompanying drawings.

DETAILED DESCRIPTION OF THE INVENTION

Overview

Figure 1A:
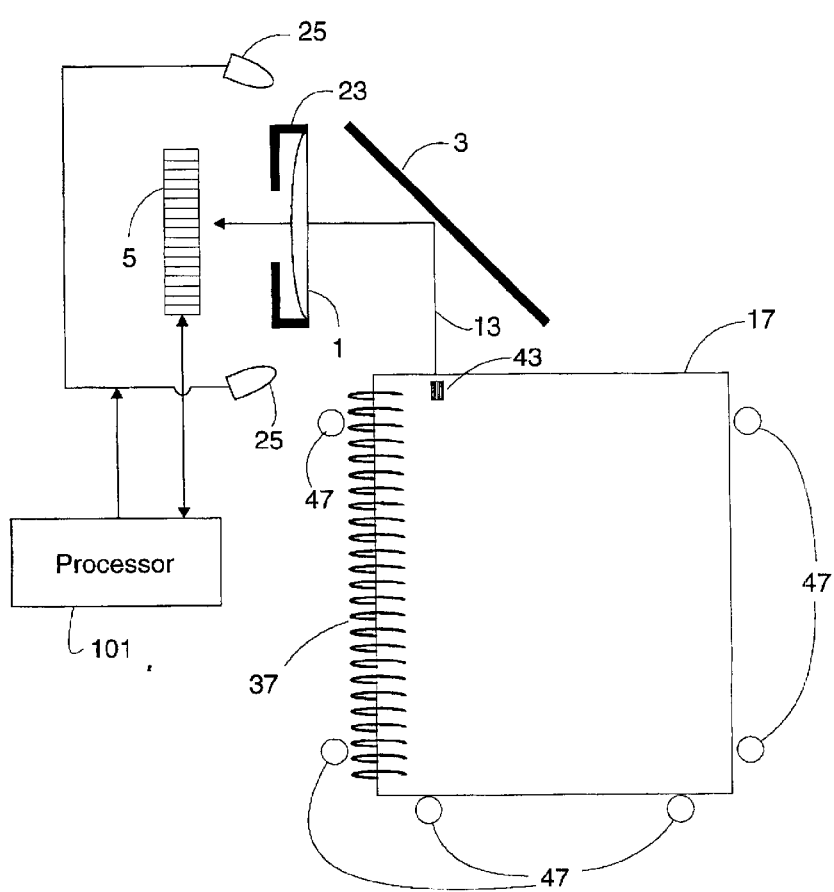
FIG. 1A shows an overview of one embodiment of the present invention.

FIG. 1A shows an overview of the page identification system including a book. Light from a printed page code 43 is reflected off a mirror 3 through a lens 1 onto an optical sensor 5. Data from the sensor is processed by a processor 101 which decodes the printed page code 43. The processor can turn on illuminators 25 if the light level is too low to properly read the code 43. In addition, a book 17 is held in place by holders 47 that maintain a substantially fixed position of the printed page code 43 with respect to the illuminators 25 and the optical assembly comprising the mirror 3, lens 1, optical sensor 5. In the embodiment shown in FIG. 1A, the holders 47 consist of a number of pegs that hold the book 17 in position. In other embodiments, the holders 47 can be a frame that holds the book 17 in position.

Figure 1B:
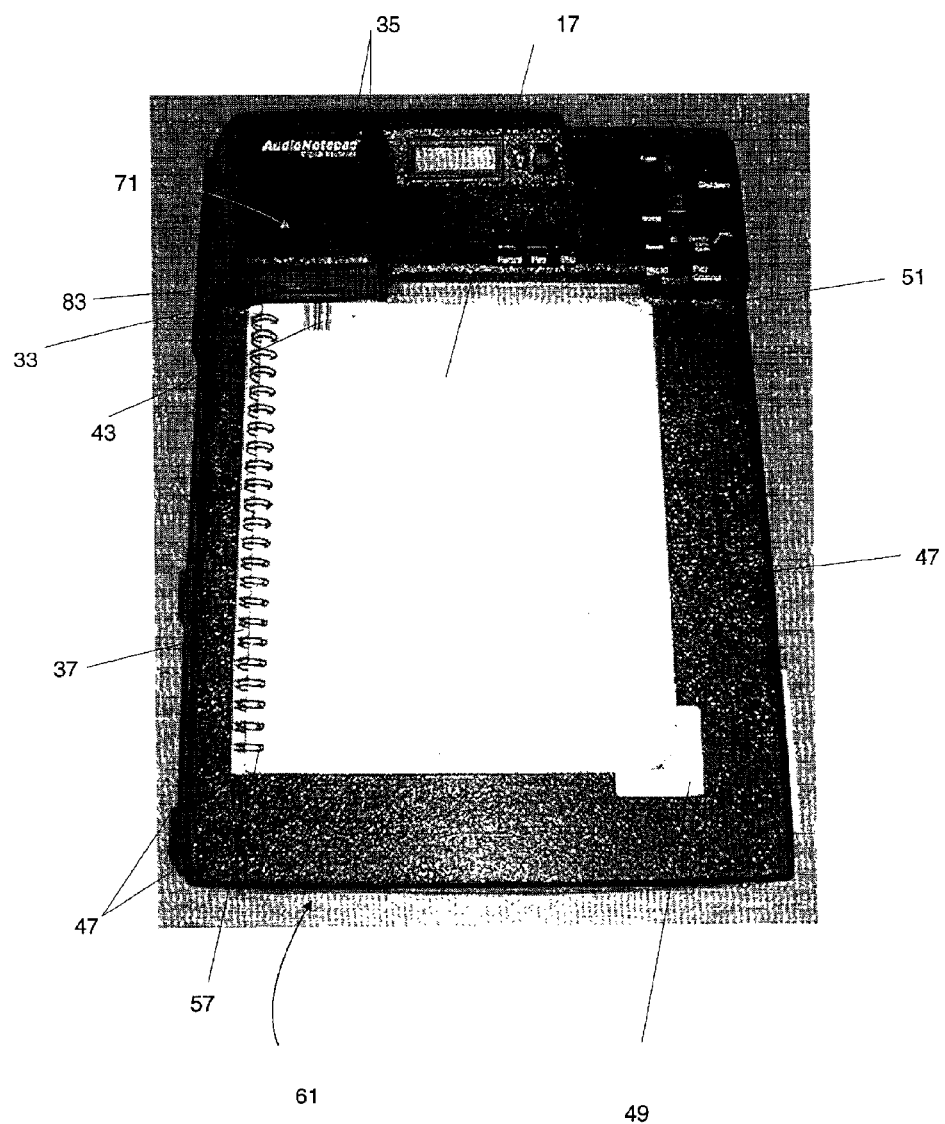
FIG. 1B is a perspective view of one embodiment of the present invention.
Figure 11:
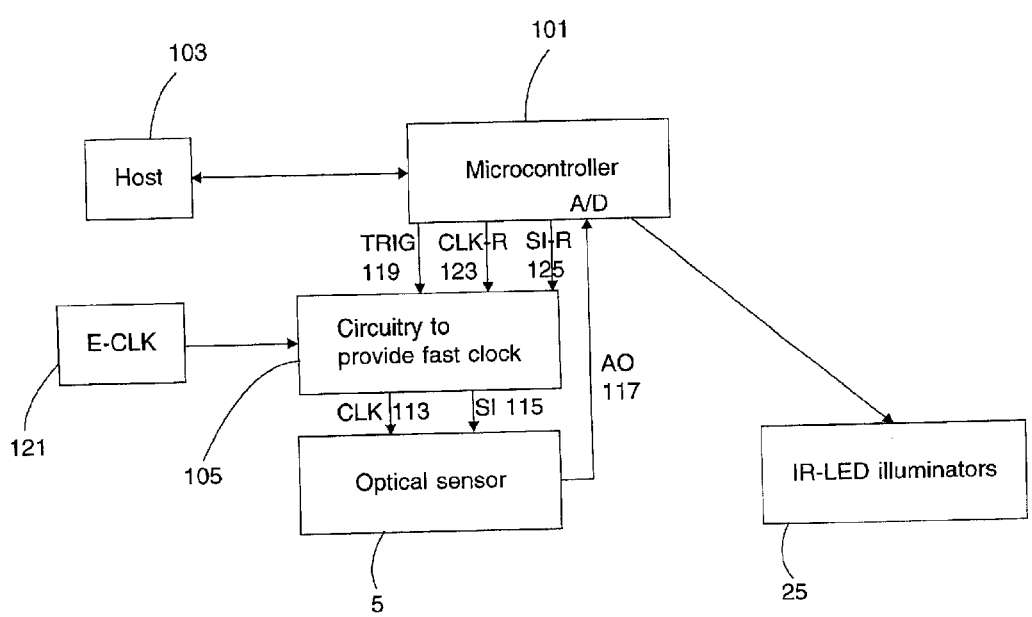
FIG. 11 illustrates that the system can incorporate circuitry to reduce the minimum integration times on slow processors.

FIG. 1B shows a multimedia recording device 61 which includes a page identification system 71. The page identification system 71 includes an optical assembly 65 (FIG. 6), a light source 25 (FIG. 8), and a processor 101 (FIG. 11). At least a portion of the page identification system 71 is disposed in a case 35. The page identification system works in conjunction with a book 17 with codes 43 on each page. The case 35 includes an opening 83 in which a transparent window 33 is positioned to protect the optical assembly 65. In some embodiments the window can be deep red, or visibly opaque while transparent to IR light. A book 17 can be placed in a holder 47 such that the location of the book 17 (and an identification code 43 located on a page) is relatively fixed in relation to the page identification system 71. The holder 47 provides a relatively fixed position, angle, and distance between the page identification system 71 and the identification code 43, thereby simplifying the hardware and software required to sense and interpret the code. The holder 47, however, does not need to secure the book rigidly. Thus, a user can easily place the book 17 down on and pick the book up from the multimedia recording device 61.

Figure 2:
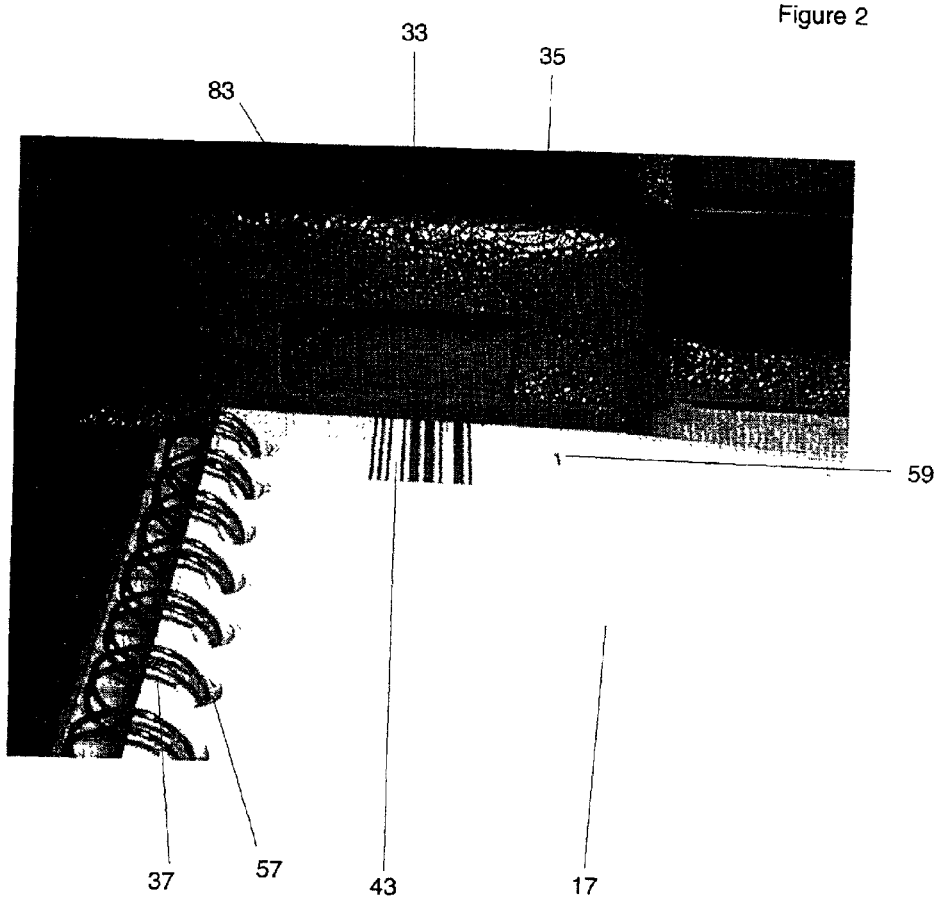
FIG. 2 illustrates a sample orientation for the relative positions of the optical assembly and the identification code on the book, in accordance with the present invention.
Figure 3:
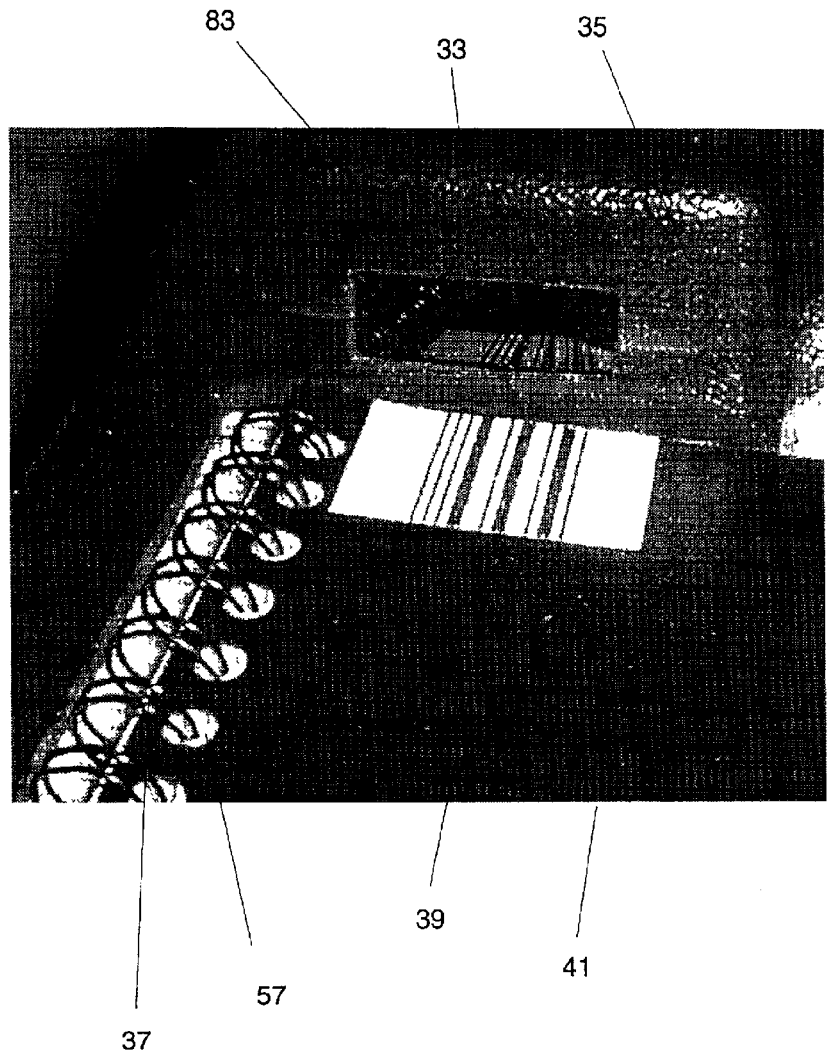
FIG. 3 illustrates that the identification code can also appear on the cover of a book, in accordance with the present invention.
Figure 4:
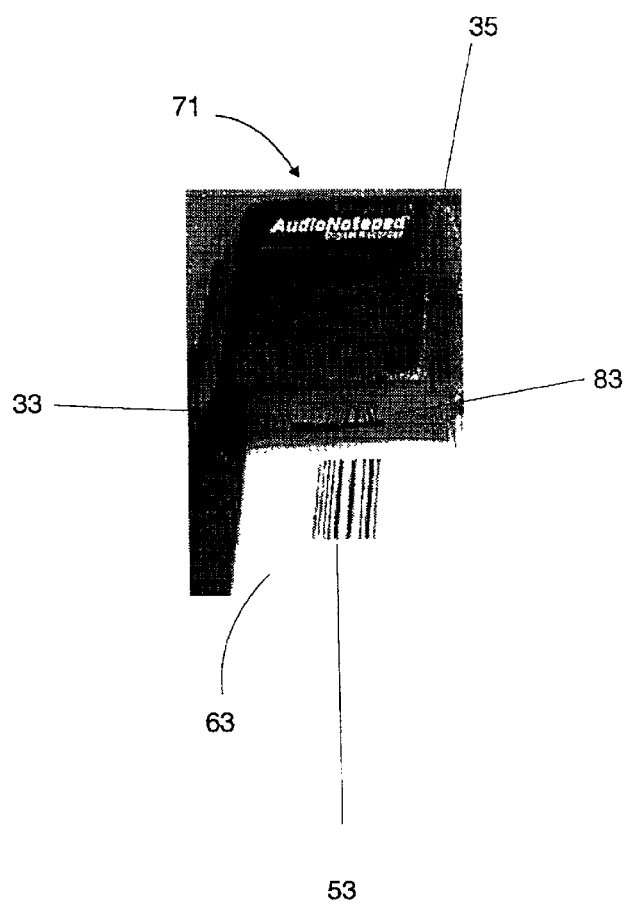
FIG. 4 illustrates that the identification code can also appear on the holder that receives the book, as an indication to the system that a book is not currently in the holder.

FIGS. 2–4 show three embodiments of a page with an identification code. In the embodiment shown in FIG. 2, the page code 43 identifies the page number. In other embodiments, the page code 43 can also be used to uniquely identify a page within a specific book. In the embodiment shown in FIG. 3, the cover code 39 is used to detect the cover of the book (i.e., that the book is closed). In other embodiments, the cover code can also be used to uniquely identify the book 17. FIG. 4 shows a "no book" code 53 on the background of the multimedia recording device 61. This code 53 is used to detect when there is no book present on the surface of the device 61. The term "page code" is used hereinafter to refer to the code on each sheet of paper 43, a code on the book cover 39, and a code on the background surface 53.

FIG. 3 show that the covers of the book can also be coded so that it can be determined if a book is present but closed. Books can be individually coded so that they can be correlated with other data, such as a removable storage medium (e.g., a disk or memory card) containing information that may relate to the information in the book.

FIG. 4 shows that other areas, such as the background area can be coded for when the book is removed. This permits easy identification of these special conditions (e.g., "no book", book cover). Alternatively, a uniform surface (such as a white or black background or book cover) can be detected, but these are difficult to distinguish from an improperly aligned book or the transitional period during a page turn.

Figure 5:
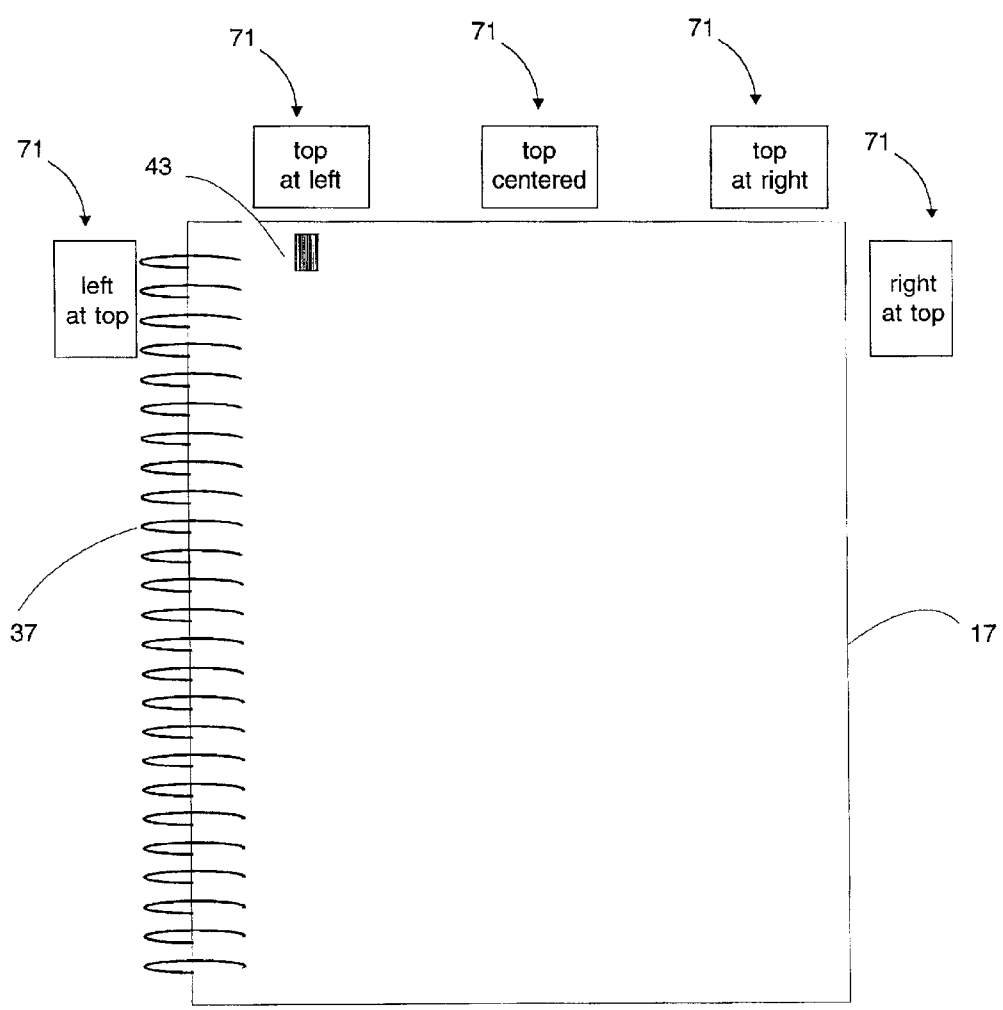
FIG. 5 illustrates a number of sample orientations for the relative positions of the optical assembly and the identification code on the book, in accordance with the present invention.

FIG. 5 shows some representative positions of the portion of the page identification mechanism 71. As shown, the page identification mechanism 71 can be located at the top left position, the left at top position, the top centered position, the top at right position, or the right at top position. It is noted, however, that other positions can be used without departing from the spirit or scope of the invention.

FIG. 5 also shows that the page code can be printed anywhere on the book pages. In one embodiment, the code 43 is printed along the top edge of the page. This area is most out of the way if the book is used for writing. The page code is optimally printed where the page lays flattest. The upper left-hand corner is near the binding of a conventionally-bound book, and is thus less prone to curling or bending of the pages. Note that the pages could also be held together by a removable binding (so pages can be taken in and out) or by a clip (as with a clipboard), used as single sheets, etc.

Optics

Figure 6:
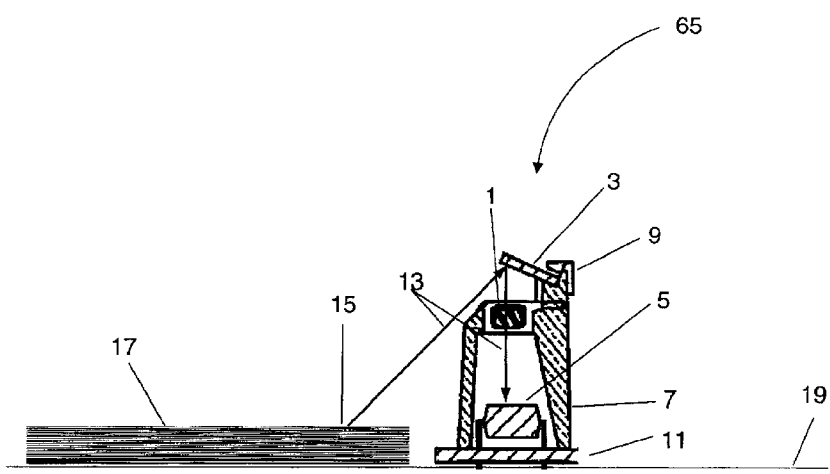
FIG. 6 is a cross-sectional view of the optical assembly and the book in accordance with the present invention. The cross-sectional view of the optical assembly illustrates the relative positions of the optical components: mirror, lens, and optical sensor. The optical path between the identification code on the book and the mirror of the optical assembly is also illustrated.

FIG. 6 shows the optical assembly 65 for the page identification system 71. One advantage of the invention is that the optical elements that form the assembly are inexpensive and easily manufactured. A simple lens 1 focuses the image of the page code 43 onto the optical sensor 5. In some embodiments, a more complex lens or lens system can be used to reduce optical aberrations. A "fold" mirror 3 changes the angle and shortens the distance between the optical sensor 5 and the page 17. As shown, a ray of light 13 from the page code 43 reflects off the mirror 3 through the lens 1 to the optical sensor 5. The mirror 3 is also used to direct the infrared (IR) illumination from the illuminators (i.e., source of IR light) 25 onto the page code 43. This arrangement allows the optical sensor 5 to be placed off to the side of the page, allowing a user to read the page, write on the page, or turn the page without the portion of the page identification system 71 disposed in the case 35 getting in the way. This configuration of optical elements permits the optical sensor 5 and the IR illuminators 25 to be mounted on a circuit board 11 that is parallel to the plane 19 of the book 17.

To obtain an optimal image, the optical sensor 5 would need to "look" directly down at the page code 43. However, such a configuration would interfere with turning the pages. In accordance with the invention, the mirror 3, lens 1, and housing 7 are configured to place the virtual location of the optical sensor 5 above the page. To increase the contrast of the image, the virtual height of the optical sensor 5 above the page is increased and the angle of incidence, normally 45 degrees, is made closer to 90 degrees relative to the page.

In one embodiment, the lens 1 is a small aperture lens (e.g., f/10) for increased depth of field. As such, all book thicknesses from zero pages to the maximum number of pages in the book remain in focus. The lens 1 reduces the size of the image and the surrounding white space and produces a real image of the code 43 on the sensor 5. In some embodiments the lens 1 can increase the size of the image on the optical sensor 5; in other embodiments the lens 1 can keep the image the original size. The magnification of the lens 1 is set so that minor misalignments of the page code 43 can be tolerated (the image of the code only fills about 70% of the active area of the optical sensor 5).

Figure 7:
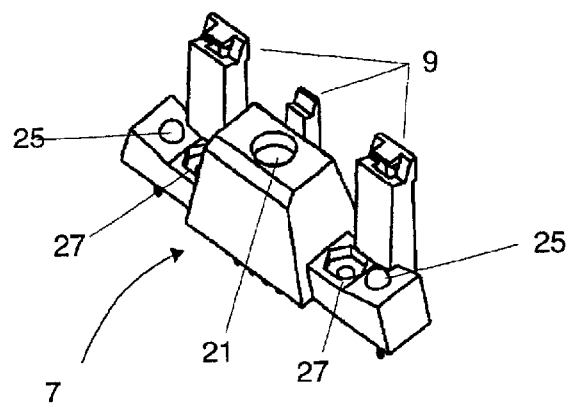
FIG. 7 is a perspective view of one embodiment of the optical housing that is part of the optical assembly (the mirror and lens are not shown).

FIG. 7 is a perspective view of the one embodiment of the optical housing 7. The housing 7 prevents stray light from impinging on the optical sensor 5. This feature is desirable as stray light on the optical sensor 5 decreases the contrast of the code image. Brackets 9 are built into the housing to support the mirror 3 at the correct angle. The case 35 protects the optical assembly 65. The window 33 prevents dirt and external objects from disturbing the optical assembly 65. In some embodiments, the housing 7 can be integrated into the case 35. The lens 1 is mounted in a lens assembly 23 that also acts as an optical stop. The lens assembly 23 is mounted in a receptacle 21 in the housing 7. The housing 7 has holes 27 to connect the housing to a printed circuit board 11 with bolts 31. Of course, the design of the housing 7 can vary.

Figure 8:
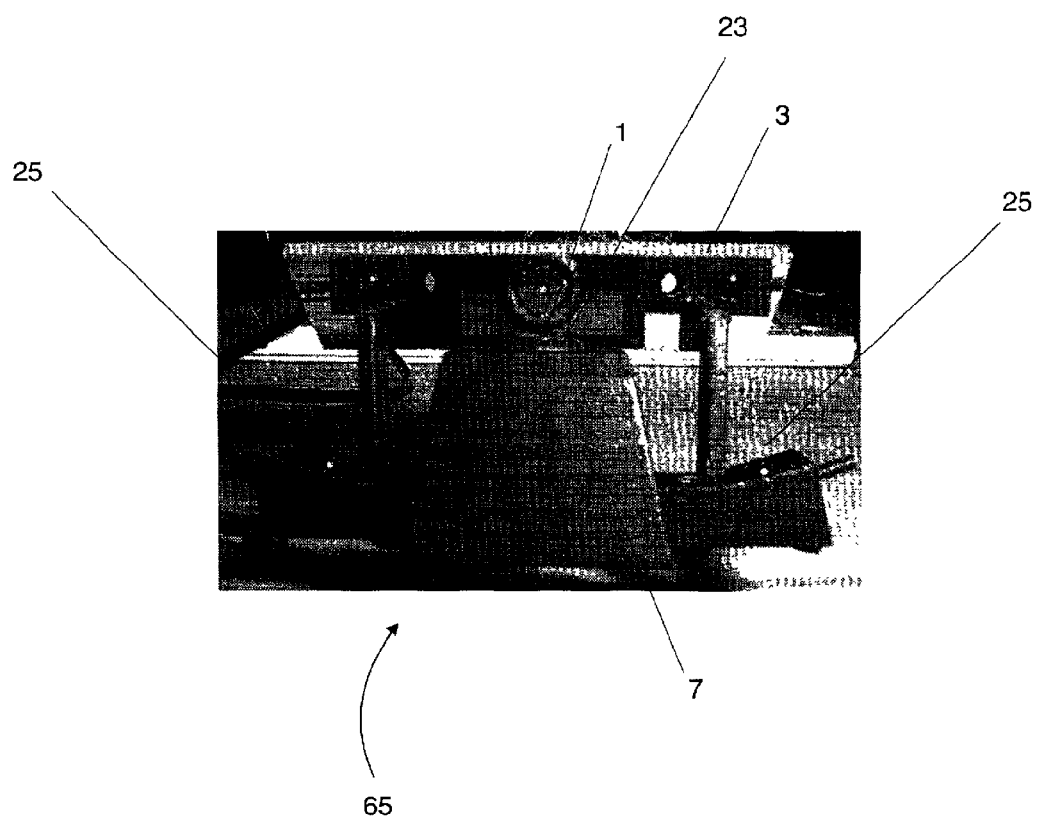
FIG. 8 illustrates the relative position and orientation of the light source, mirror, and lens of the optical assembly, in accordance with the present invention.

FIG. 8 illustrates the relative position and orientation of the light source, mirror 3, and lens 1 of the optical assembly 65. In one embodiment, the light source comprises Infrared Light Emitting Diodes (IR-LEDs) 25. The IR-LEDs 25 are small, inexpensive, and practical sources of infrared light. As shown, illumination from two IR-LEDs 25 is reflected by the mirror 3 onto the page code 43. The housing 7 holds the IR-LEDs 25 at an angle such that when reflected off the mirror 3, the illumination is centered on the page code 43. This dual IR-LED 25 configuration provides relatively even illumination over the page code target area. Of course, the number and configuration of IR-LEDs can vary.

Figure 9:
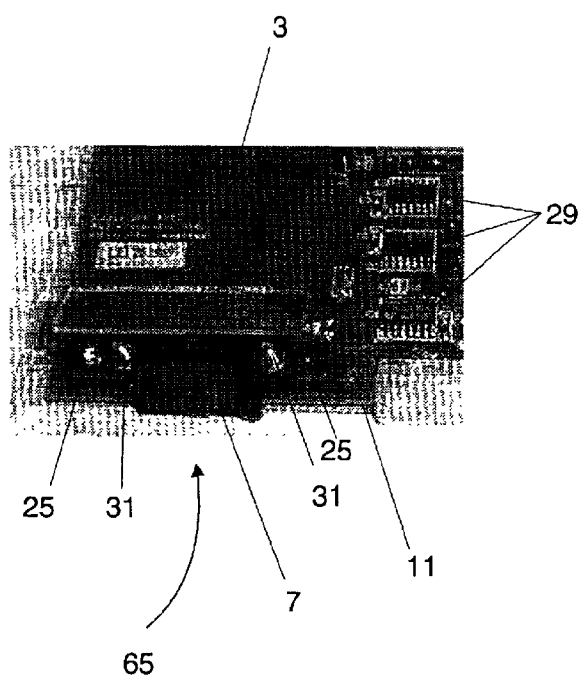
FIG. 9 illustrates the orientation of the optical assembly relative to the electronic subsystem of the present invention.

FIG. 9 illustrates the orientation of the optical assembly 65 relative to the electronic subsystem. The optical housing 7 is mounted on a circuit board 11 along with external control circuitry 29. In one embodiment, the optical sensor 5 can be a single chip optical sensor (e.g., Texas Instruments TSL1401, 128×1, linear sensor array), which reads the page code 43. The TSLI401, for example, is a charge mode CMOS photodiode array that is less expensive and requires less external components than a CCD array. The linear dimension of the optical sensor is used to electronically scan across the printed page code 43. The use of this type of low cost optical sensor is possible because the size and location of the page code 43 are relatively fixed with respect to the optical sensor 5. This small optical sensor 5 is matched to the information content in the codes that are read by the system. In other embodiments, a two-dimensional sensor chip could be used to read area-based bar codes, recognize numerals (e.g., "1", "2", "3", . . . ) directly, or identify other objects printed on the page.

Bar Codes

In one embodiment, a width modulated bar code is used so that precise alignment between the sensor 5 and the page code 43 is not required. For example the interleaved 2-of-5 (ITF) format consists of 5 black bars and 5 white bars. Two bars of each color are wide and three bars are narrow with the code ending in a white bar. The ITF format encodes an even number of digits, and provides a relatively high data density. The ITF specifies a two bar start code and a two bar stop code. While the ITF format contains built-in redundancies, additional digits can be used for further redundancy. Note that the terms "start code" and "stop code" are used herein, in the art these are sometime referred to as a "start/stop character" or a "start/stop pattern".

The start and stop codes as defined by the ITF specification can be simplified because of the physical constraints of the system (i.e., fixed length code, known orientation, etc.). Simplifying the start and stop codes (such as only using a single narrow-bar stop code) allows wider bars to be used in the same amount of space, leading to a higher signal-to-noise ratio in the resultant image. The start and stop codes are traditionally used because the location and orientation of the bar code is unknown. The background of the area 63 that is viewed by the sensor can contain a special code 53 so that the system can easily determine if a book is not present.

Electronics

Figure 10:
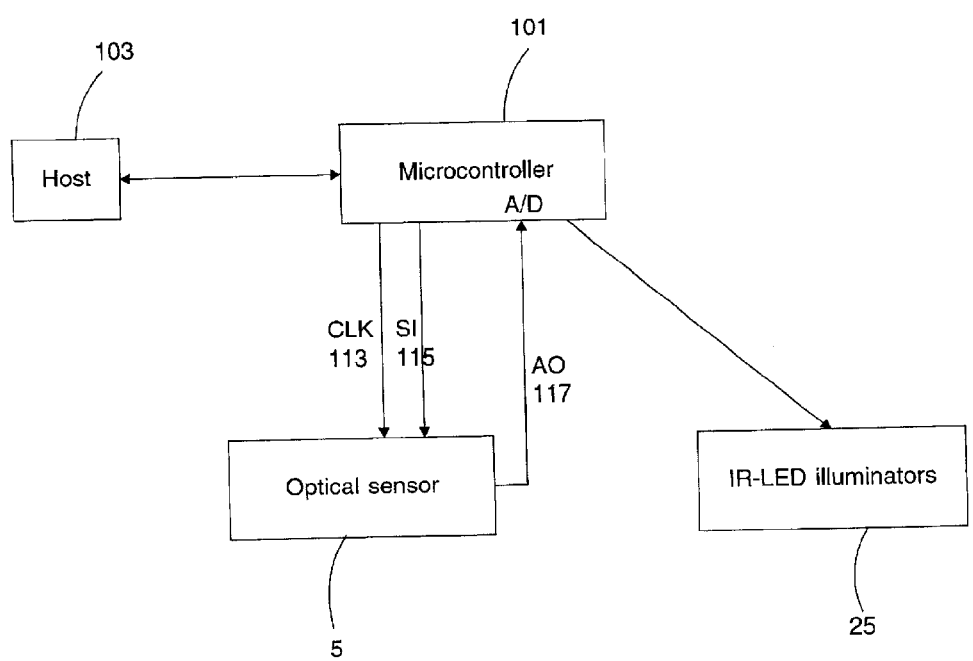
FIG. 10 is a block diagram of the electronic subsystem of the present invention. In particular, the processor is shown coupled with the optical sensor, the light source, and a host computer.

FIG. 10 shows a block diagram of the electrical components of one detailed embodiment of the invention. A processor 101 (e.g., a Motorola MC68HC11 microcontroller) operates the optical sensor 5, and decodes the code 43 in software. Control lines from the processor 101 to the optical sensor 5 include a clock signal 113 and a signal to start the integration 115 of the optical information. The analog output 117 from the optical sensor 5 is read by an analog-to-digital converter (A/D) in the processor 101 or by an external A/D.

Figure 12:
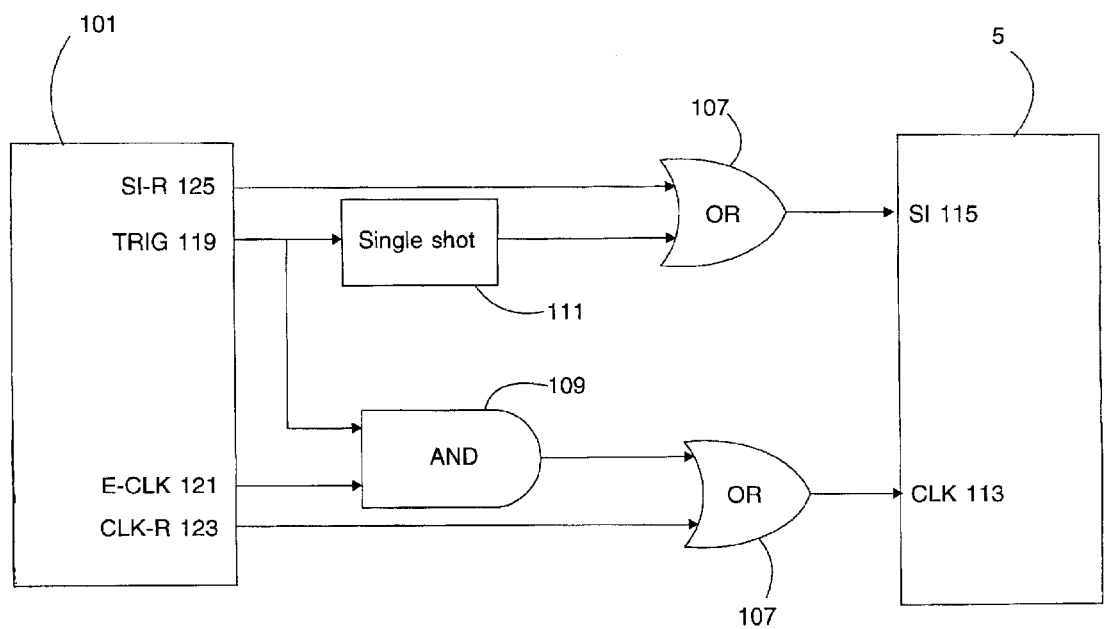
FIG. 12 depicts sample electronic circuitry that can be used to reduce the minimum integration times on slow processors.

FIGS. 11 and 12 show additional circuitry can be added to allow short integration times under bright light conditions. This circuitry would be advantageous if the processor 101 is not fast enough to provide clock signals to allow for the minimum integration time of the optical sensor 5. This circuitry uses a trigger signal 119 to produce a start integration (SI) signal 115 from a single shot 111 and gate a fast clock signal 121 to the sensor 5. The trigger signal 119 is turned off by the processor 101 after the appropriate number of clocks have passed. Raw SI-R 125 and CLK-R 123 signals directly from the processor 101 are also used to clock out the analog output of the optical sensor 5 under software control.

A method that can be used to adapt the optical sensor 5 to the ambient light level follows. The processor 101 is programmed in software to vary the integration time of the optical sensor 5 to optimize the resulting signal level output from the optical sensor 5. The analog output level of the optical sensor 5 is linearly related to the amount of light falling on the optical sensor 5. The analog output level of the optical sensor 5 is also linearly related to the integration time of the optical sensor 5. Thus, increasing the integration time can be used to compensate for a low light level, and decreasing the integration time can compensate for a high light level. A binary search of different integration times is used to adjust for different lighting levels. This technique acts as an automatic gain control, so that the optical sensor 5 always outputs an acceptable signal level regardless of the ambient light level. The maximum analog output level 117 that can be generated by the optical sensor 5, without saturating the optical sensor 5, is used as a goal value. The integration times are varied in an attempt to come within a small delta of this goal value. If this goal value cannot be attained, the integration time that produces the widest range of outputs (i.e., black-to-white contrast without saturating the optical sensor 5) is used. If the lighting conditions change, or the code 43 is temporarily obscured, the search can fail. If the search fails to find an appropriate integration time, the search is restarted.

The processor 101 is programmed in software to decode the image data from the optical sensor 5. After a successful decoding, the page identifier is compared to the last successfully decoded page identifier. If the page identifier is different (i.e., a page has been turned), the new page identifier is sent to the host computer system 103. This technique reduces the amount of data that is transferred to the host computer system 103. The array of raw data (Rarray) from the optical sensor 5 is first smoothed such as with a median filter. This smoothed result is then differentiated to produce an array of derivative values (DArray). The maximum of the absolute value of these differentiated values is multiplied by a constant to determine a threshold value (THRESH). This threshold value is used in finding peaks and valleys in the derivative array. A peak in the derivative array corresponds to the start or end of a bar within the optical code. Each point in the derivative array is compared against the threshold and surrounding points to find local minima and maxima. If the code begins with the correct type of extrema (i.e., a minimum indicating a white to black transition for the first bar in the code), the decoding process continues. The width of each bar is found by calculating the difference in the position of each extrema. If the correct number of bars are found for the bar code symbology, the decoding process continues. If the widths of the bars in the start and stop code match those specified by the bar code symbology, the bar code is decoded using a standard "reference" decoding algorithm. If a valid decoded value is found, it is used as the page identifier.

In accordance with the invention, the IR-LED illuminators 25 are selectively activated if the ambient light level is too low for the optical sensor 5 to operate properly. This technique saves power and produces less heat. In one embodiment, the illuminators 25 are either on or off; in another embodiment, the illuminators 25 can provide a variable output level of light.

If the integration time of the optical sensor 5 is greater than a pre-determined threshold, the IR-LED illuminators 25 are turned on during the sensor 5 integration period. The IR-LED illuminators 25 are turned on at a light level when they just become effective (relative to the ambient light level) at illuminating the code 43 otherwise there could be an instability in the binary search light-level detection algorithm. Turning on the IR-LED illuminators 25 prevents the integration time from getting too long, and slowing down the responsiveness of the system.

Figure 13:
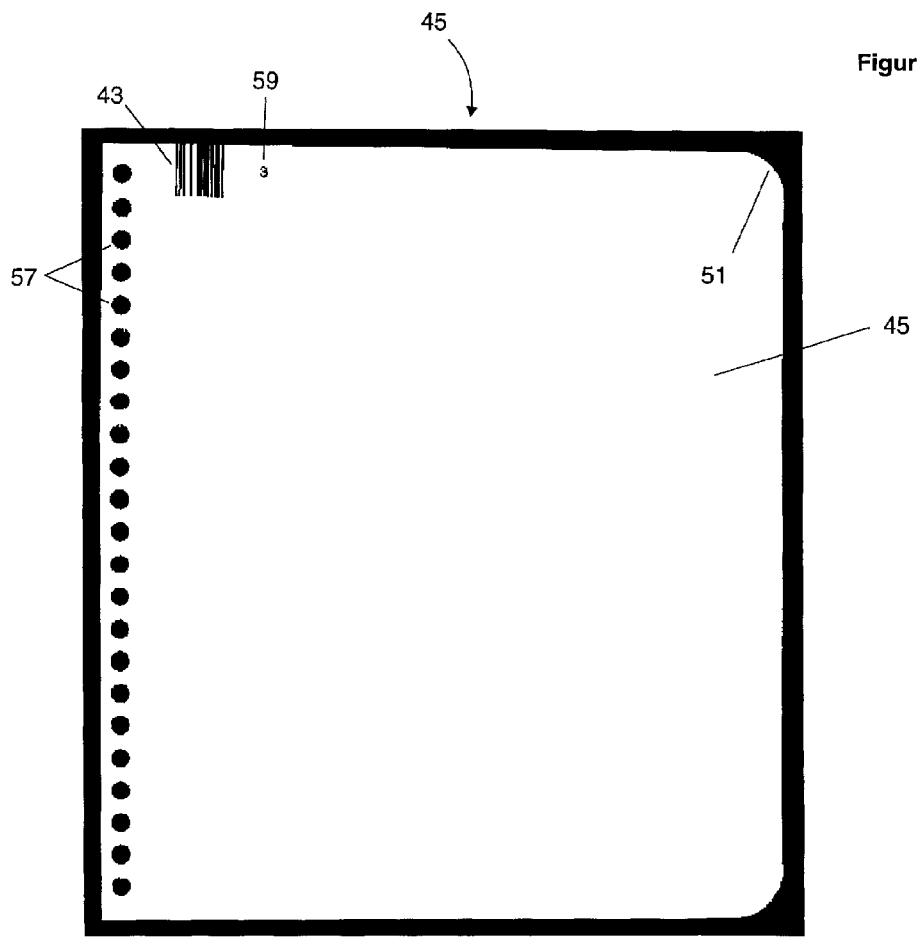
FIG. 13 depicts a sample page with a printed page code.

FIG. 13 shows a sample page 45 with a printed page code 43. The type of binding method impacts the alignment of the coded portion of the book 17 with the page identification system 71. A spiral binding allows pages to be completely flipped over and the book 17 to be folded in half. However, the nature of the spiral causes pages to be shifted up or down depending upon the position of the page within the book 17. A non-spiral binding 37 (such as Wire-O) is preferred since the pages do not move vertically as they are turned. Holes for a Wire-O type binding are typically round or square. Small round holes 57 are preferred over square holes, as they minimize lateral movement of the pages so that the position of the page code 43 remains fairly consistent. Round holes also permit easier turning of pages than square holes, and don't tear as easily. Rounded corners 51 help prevent curling or folding of the page corners.

Figure 14A:
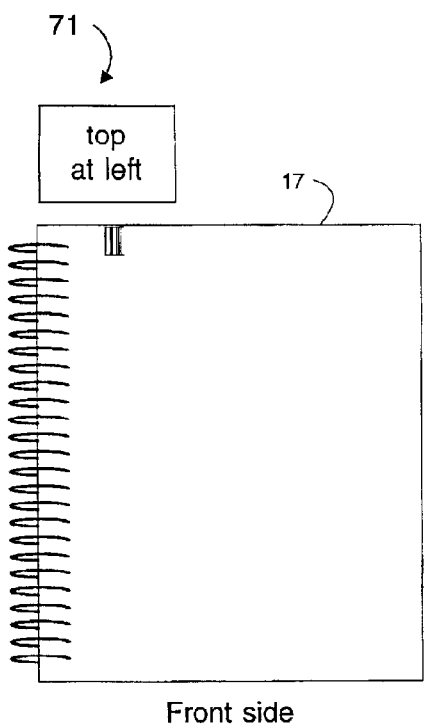
FIG. 14 illustrates sample page code locations for double sided books.
Figure 14B:
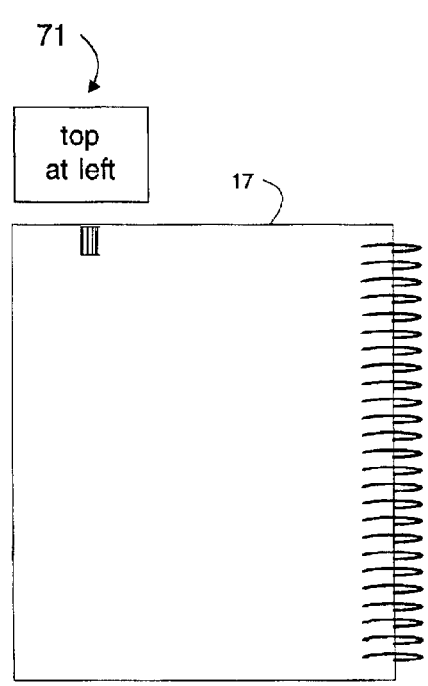
Figure 14C:
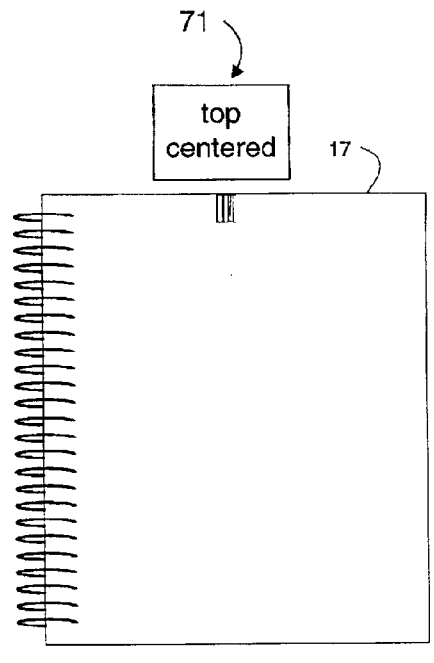
Figure 14D:
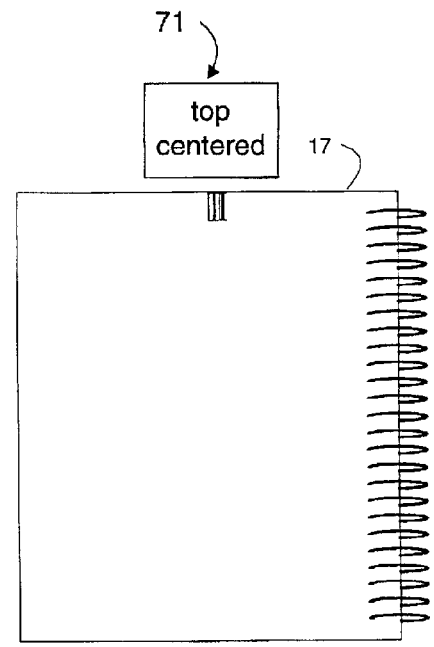

FIGS. 14A–14D show that page code 43 can be printed on both sides of a page to provide a double-sided book. In this case, printing the page code at the top center of the page may be optimal. If the page identification system 71 is at the top and left of the page (FIGS. 14A and 14B), the page code for the back side of the page must be at the outside corner of the page (FIG. 14B). If the page identification system 71 is at the center of the page (FIGS. 14C and 14D), the page code for both the front side and back side of the pages are equally far from the corners of the page, and hence less prone to bending, folding, or curling.

Figure 15:
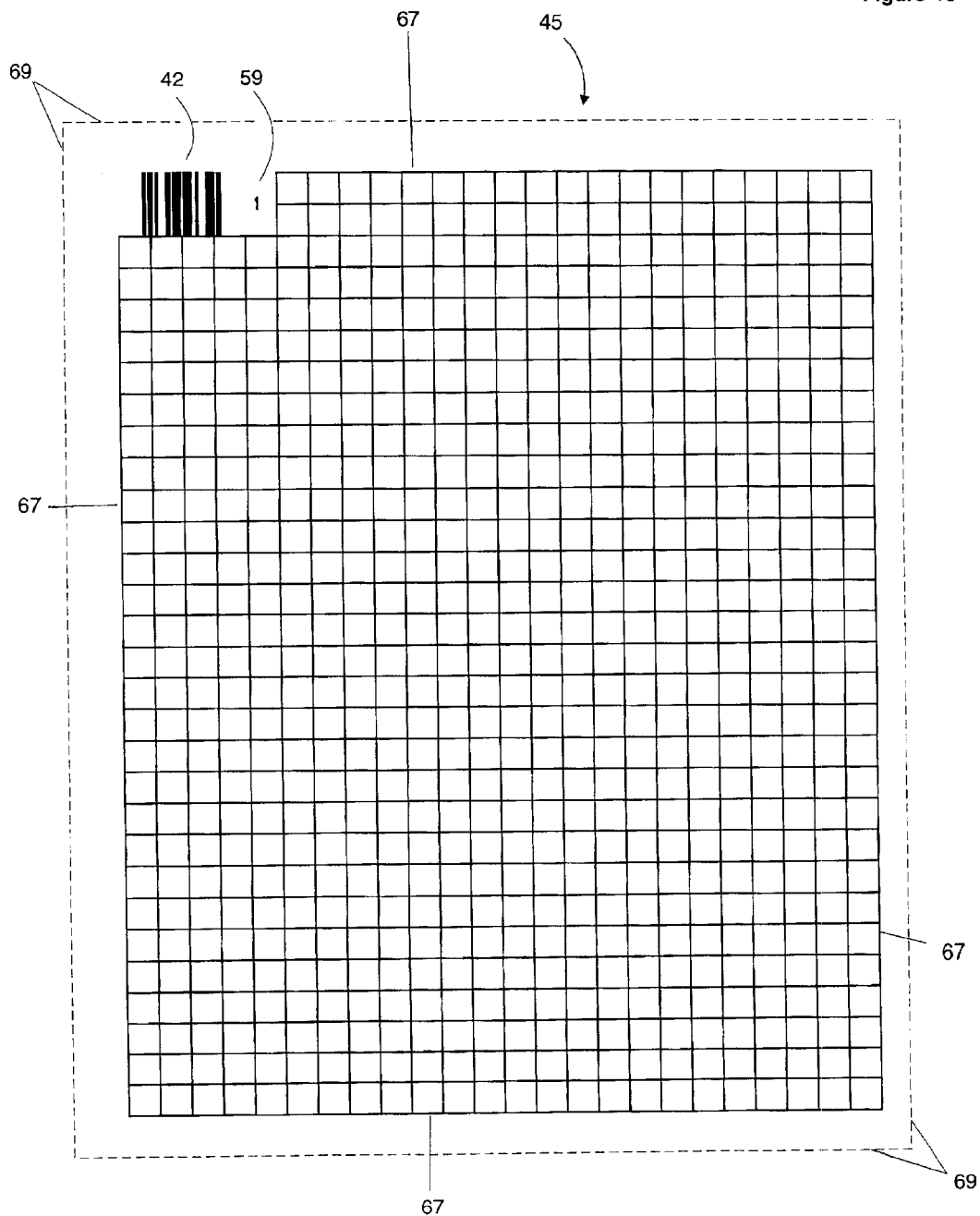
FIG. 15 illustrates the border of the valid writing area on a page.

FIG. 15 shows that in some configurations the active area sensed under the book 17 may not extend all the way to the edges of the book page. For example, a digitizing tablet under the book 17 can to sense pen or stylus strokes on a page, but the tablet area may not extend all the way to the edge of the paper. In this case placing a visible border on the page indicates the allowable writing area 67. The edge of the page 69 is shown along with the code 43, and a human readable page number 59.

Figures 16A, 16B:
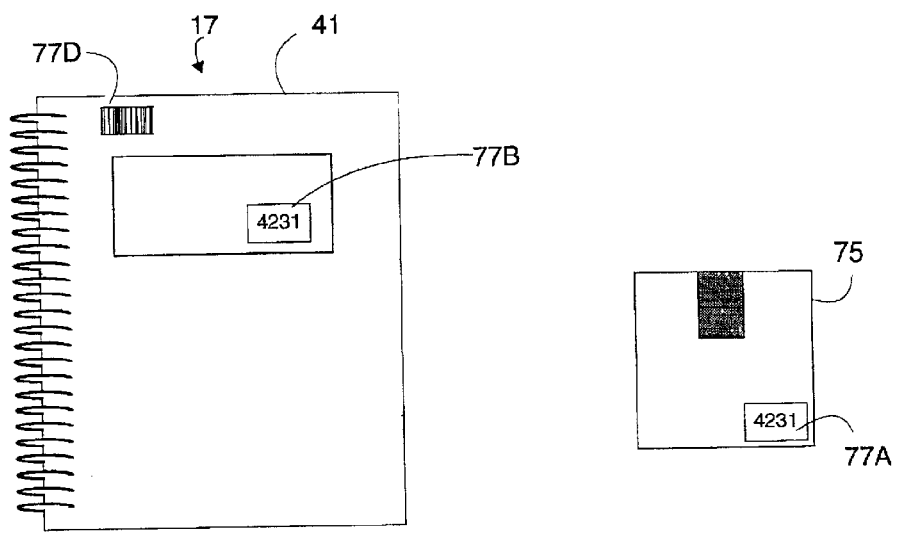
FIG. 16 depicts sample locations of key numbers that correlate the book with related recording media.
Figure 16C:
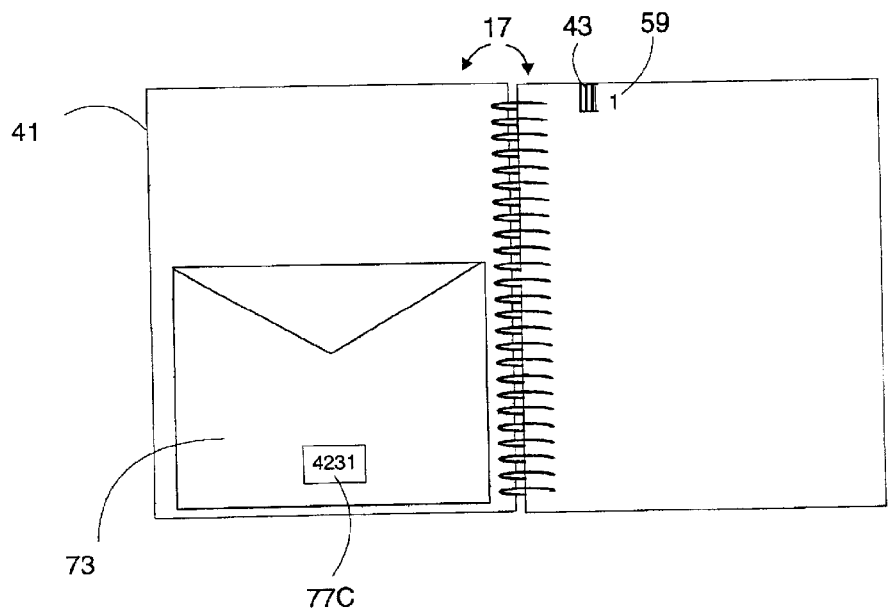

FIG. 16 shows the book 17 may also contain a pocket or sleeve 73 for holding storage media 75 (such as a disk or memory card) when it is not in use. This media, for example, may hold data relating to a book, such as audio, video, pen data, and so on. This sleeve 73 is labeled with a key number 77C that matches the key number 77A on the storage media so that a one-to-one correspondence between books and storage media is maintained. This key number 77B also appears on the cover 41 of the book, and may be contained in the code 77D on the front cover of the book for automatic identification of the book. The key number on the cover 77B can be correlated with a key number encoded in the storage media.

Figure 17:
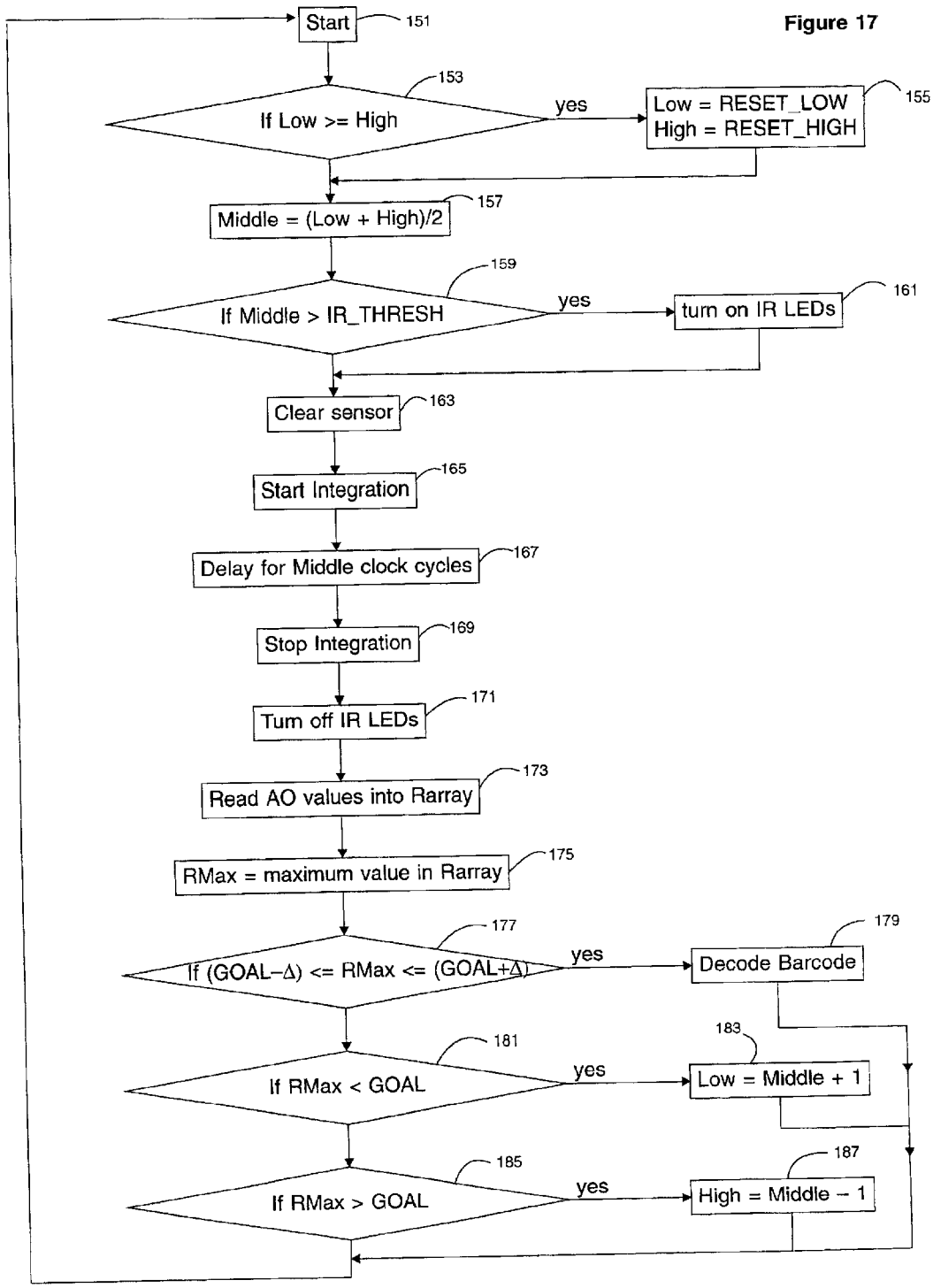
FIG. 17 is a flow chart illustrating how the integration times can be modified to optimize the output signal level of the optical sensor in response to varying ambient light conditions.

FIG. 17 illustrates one method that can be used to adapt the optical sensor 5 to the ambient light level. The microcontroller 101 is programmed in software to vary the integration time of the optical sensor 5 to optimize the resulting signal level output by the optical sensor 5. The analog output level of the optical sensor 5 is linearly related to the amount of light falling on the optical sensor 5. The analog output level of the optical sensor 5 is also linearly related to the integration time of the optical sensor 5. Thus, increasing the integration time can be used to compensate for a low light level, and decreasing the integration time can compensate for a high light level. In one embodiment a binary search of different integration times is used to adjust for different lighting levels. This technique acts as an automatic gain control, so that the optical sensor 5 always outputs an acceptable signal level regardless of the ambient light level. The maximum analog output level 117 that can be generated by the optical sensor 5, without saturating the optical sensor 5, is used as a goal value. The integration times are varied in an attempt to come within a small delta of this goal value. If this goal value cannot be attained, the integration time that produces the widest range of outputs (i.e., black-to-white contrast without saturating the optical sensor 5) is used. The flow chart in FIG. 17 shows the sequence of steps used to vary the integration times in an attempt to match the goal light level.

FIG. 17 is an overview of the binary search used on real-time data to find the proper integration time for the optical sensor 5. The light level adaptation process begins with the start initialization step 151. Step 151 initializes variables such as Low and High that may be uninitialized. Low and High represent the lower and upper limits of the integration time as the search progresses. In the embodiment shown, these values represent a loop counter delay controlled by the processor 101. In step 153, if variable Low is greater than or equal to variable High, both variables are reset in step 155. A Middle value is set to the average of High and Low in step 157. The Middle value is the integration time that is used by the sensor on the current iteration of the binary search. The Middle value is tested in step 159-if it is greater than a threshold (IR_Thresh), the illuminators 25 are turned on in step 161. The optical sensor 5 is the cleared in step 163 and the integration is begun in step 165. The processor waits Middle amount of time in step 167. Note that the overhead of other processing can be compensated for, and a Middle delay time of zero corresponds to the minimum integration of the sensor 5. The processor then stops the integration in step 169. The illuminators 25 are then turned off in step 171. In some embodiments it is simplest and fastest to always turn off the illuminators 25, rather than bother to check to see if they are turned on.

In step 173 the analog values are read out of the optical sensor 5, digitized, and stored in an array called Rarray. The maximum value of the elements in Rarray is found in step 175 and stored in variable RMax. RMax thus represents the brightest portion of the image captured by the sensor 5. RMax is then compared against a desired value called GOAL in steps 177, 181, and 185. GOAL is a desired output value from the sensor 5 that is less than the saturation point of the sensor. If RMax is within a small delta of the GOAL as shown in step 177, the integration time produces a good image on the optical sensor 5, so the optical information in Rarray is decoded in step 179. Step 179 decodes the bar code data from the image of the page code 43. Step 181 shows that if RMax is less than the GOAL, meaning the integration time should be increased, the variable Low is set to Middle+1 in step 183. If RMax is greater than the GOAL in step 185, the integration time should be decreased, so variable High is set to Middle−1 in step 187. The binary search algorithm is then iterated by returning to step 151. While the embodiment shown in FIG. 17 attempts to maximize RMax, other embodiments can optimize other values, such as the black to white contrast in the image (e.g., RMax minus the minimum value stored in Rarray).

If the lighting conditions change, or the code 43 is temporarily obscured, the search can fail. If the search fails to find an appropriate integration time, the search is restarted by re-initializing the values of Low and High in step 155.

While the present invention has been shown and described with reference to the described embodiments, it should be understood by those skilled in the art that various changes in form and detail may be made therein without departing from the spirit and scope of the invention.

We claim:

1. A system for sensing information from an identification code disposed on a page, the system comprising:
    a holder to maintain the page in a predetermined position;
    an optical assembly comprising an optical sensor for receiving ambient light reflected from the identification code and generating a signal representative thereof, wherein the holder fixedly positions the optical assembly adjacent to an edge of the page, and wherein the optical assembly is configured to place a virtual location of the optical sensor above the page;

a processor coupled to the optical sensor for processing the signal; and a light source coupled to the processor.

2. The system in accordance with claim 1, wherein the identification code comprises a bar code.

3. The system in accordance with claim 1, wherein the processor activates the light source when the processor determines, based on the signal, that the ambient light is low.

4. The system in accordance with claim 3, wherein the light source generates non-visible light.

5. The system in accordance with claim 1, wherein the processor executes a search of integration times to maximize the signal.

6. The system in accordance with claim 5, wherein the search executed by the processor is a binary search.

7. The system in accordance with claim 1, wherein the optical assembly further comprises a reflecting element and a focusing element, wherein the reflecting element directs the reflected ambient light onto the focusing element and the focusing element focuses the reflected ambient light onto the optical sensor.

8. The system in accordance with claim 7, wherein the optical sensor and the page are substantially coplanar.

9. The system in accordance with claim 7, wherein the relative locations of the page and the reflecting element position the optical sensor at the virtual location above the page.

10. A system for reading an identification code provided on a page, the system comprising:

means for maintaining the page in a predetermined position;

means for illuminating the identification code;

means for receiving ambient light reflected from the identification code and generating a signal representative thereof, wherein the means for maintaining fixedly positions the means for receiving adjacent to an edge of the page, and wherein the means for receiving is configured to be virtually located above the page; and means for processing the signal and selectively activating the means for illuminating according to the ambient light, wherein the means for maintaining, the means for illuminating, the means for receiving, and the means for processing are operatively coupled.

11. A system for reading an identification code from a page, the system comprising:

a holder for maintaining the page in a predetermined position;

a light source for selectively illuminating the identification code;

a mirror optically coupled to the light source and the identification code, the mirror disposed to direct light from the light source to the identification code and direct light reflected from the identification code;

a lens optically coupled to the mirror for focusing the reflected light;

a sensor optically coupled to the lens for receiving the focused light, the sensor generating a signal representative of the focused light, wherein the sensor is virtually located above the page; and a processor for processing the signal and selectively activating the light source to supplement ambient light.

12. The optical system in accordance with claim 11, wherein the processor activates the light source when the signal indicates that the ambient light is low.

13. The optical system in accordance with claim 11, wherein the processor executes a search of integration times such that the signal has a range of output values.

14. A method for reading an identification code on a page, the method comprising the steps of:

a) configuring an optical assembly substantially coplanar with the page such that an optical sensor therein is virtually located above the page;

b) receiving light reflected from the page, wherein the reflected light is representative of the identification code;

c) generating an electrical signal corresponding to the reflected light;

d) processing the electrical signal to select an integration time of the optical sensor; and e) decoding the identification code.

15. The method in accordance with claim 14, wherein the processing step further comprises:

i) performing a search to select the integration time;

ii) using the integration time to change an analog output level of the optical sensor; and iii) repeating steps i) and ii) to vary the integration time and approach a maximum analog output level without saturating the optical sensor.

16. The method in accordance with claim 14, wherein the processing step further comprises:

i) performing a search to select the integration time;

ii) using the integration time to broaden a range of analog output levels of the optical sensor; and iii) repeating steps i) and ii) to vary the integration time and approach the widest range of analog output levels without saturating the optical sensor.

17. A method for reading an identification code on a page, the method comprising the steps of:

a) disposing an optical assembly adjacent and substantially in the same plane as, but not overlying, the page;

b) receiving light reflected from the page, wherein the reflected light is representative of the identification code;

c) generating an electrical signal corresponding to the reflected light;

d) processing the electrical signal to read the identification code; and e) selectively activating an artificial light source to illuminate the page in response to step d).

* * * * *